Dec. 29, 1970  D. H. McMASTER  3,551,130
APPARATUS FOR APPLYING GAS AGAINST THE
OPPOSITE SURFACE OF A SHEET OF GLASS
Filed Jan. 22, 1968  3 Sheets-Sheet 1

INVENTOR.
Dexter H. McMaster
BY
Barnard, McGlynn & Reising
ATTORNEYS

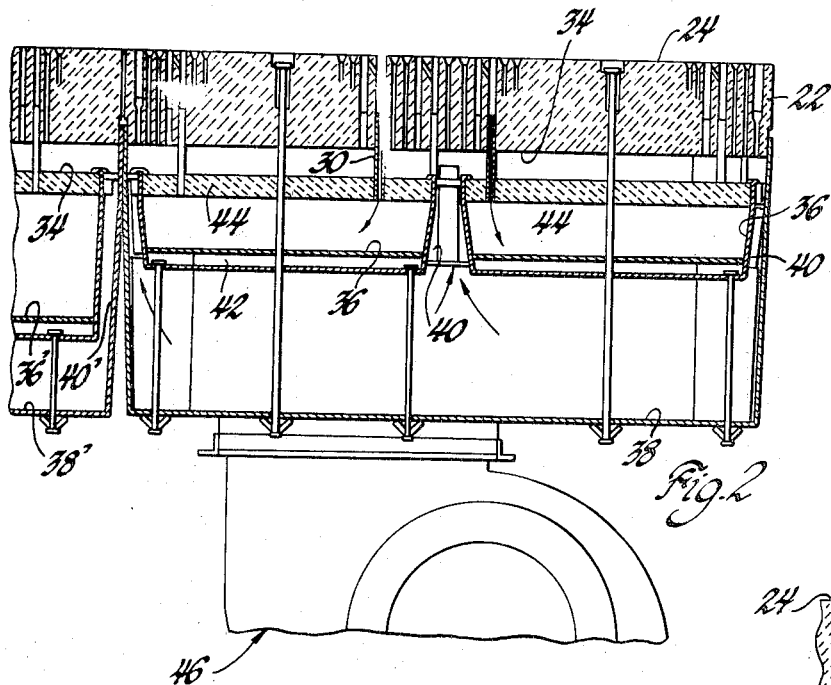
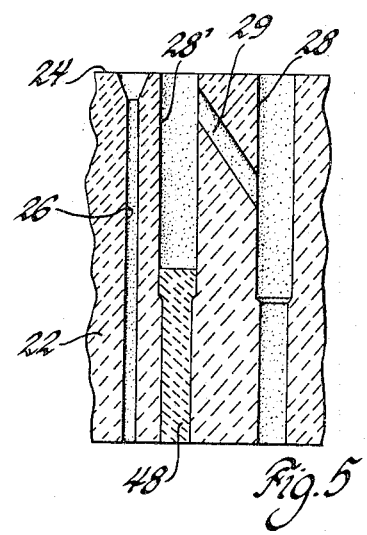
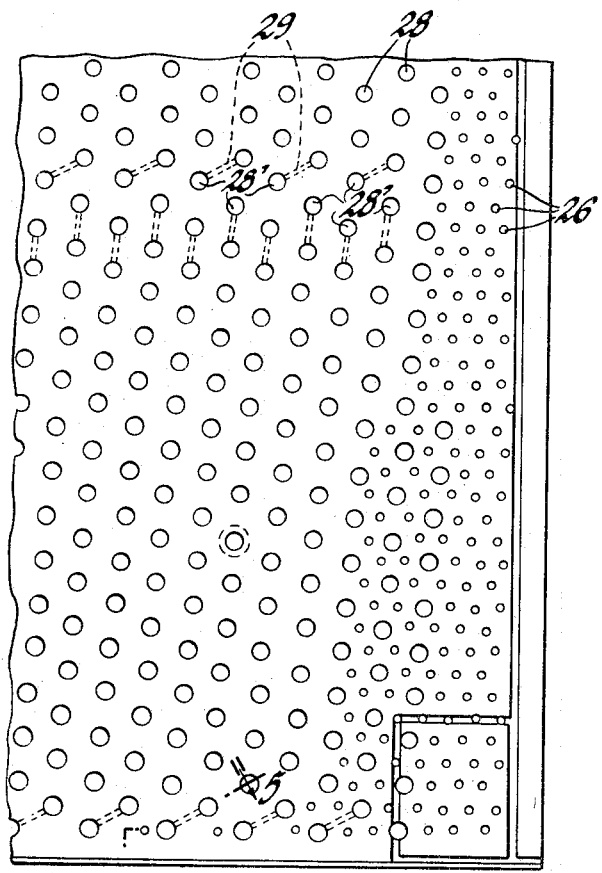
INVENTOR.
Dexter H. McMaster

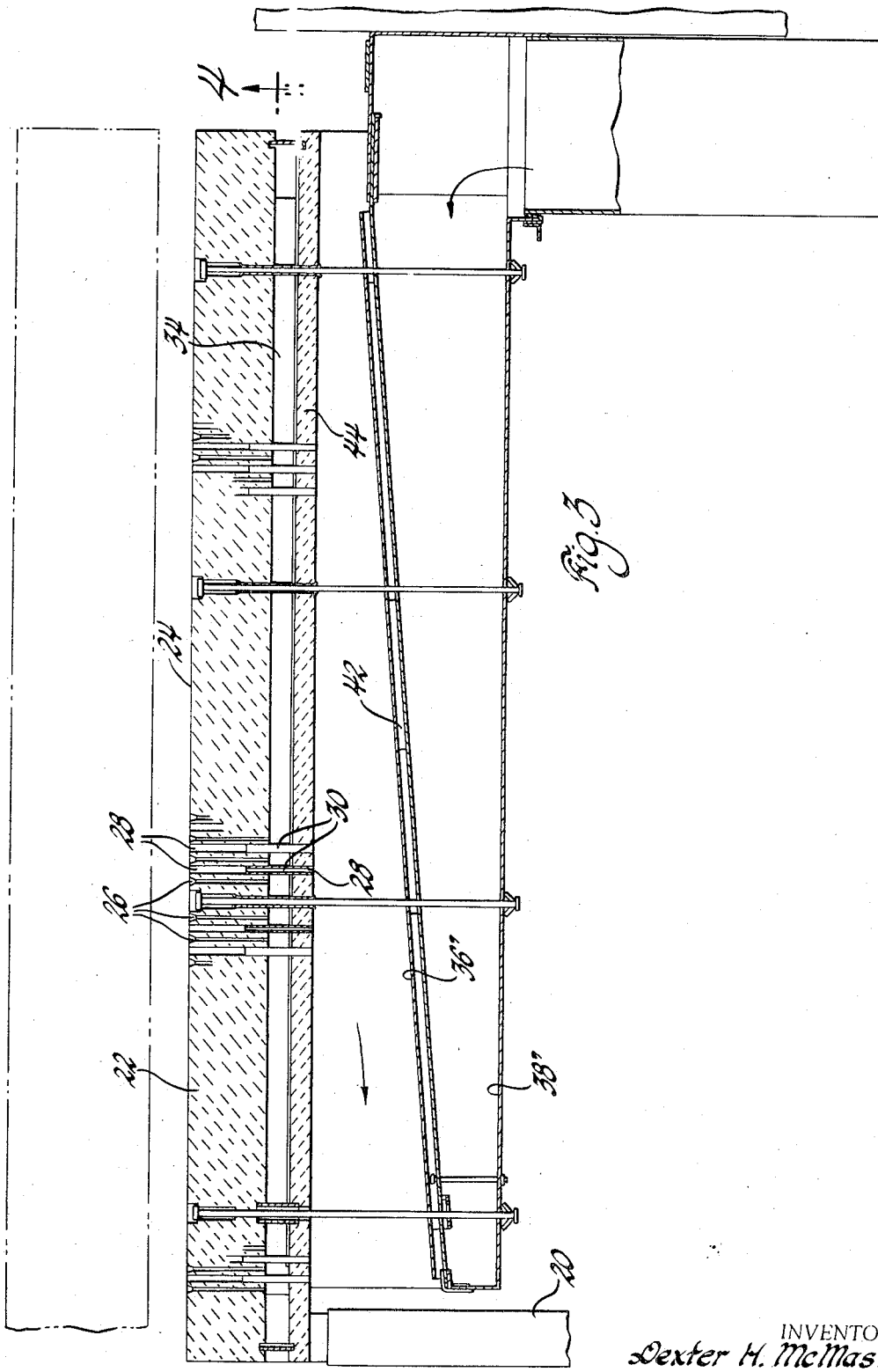

United States Patent Office 3,551,130
Patented Dec. 29, 1970

3,551,130
APPARATUS FOR APPLYING GAS AGAINST THE OPPOSITE SURFACES OF A SHEET OF GLASS
Dexter H. McMaster, Genoa, Ohio, assignor to Permaglass, Inc., Millbury, Ohio, a corporation of Ohio
Filed Jan. 22, 1968, Ser. No. 699,632
Int. Cl. C03b 29/04
U.S. Cl. 65—182                                   10 Claims

ABSTRACT OF THE DISCLOSURE

An apparatus including a furnace for transferring heat between a sheet of glass and gases as the sheets are supported on gases over an elongated bed disposed within the furnace. The bed has a plurality of inlet passages and a plurality of exhaust passages extending therethrough and sheet metal means is suspended from the bed for defining an inlet chamber which is coextensive with the bed and a plurality of exhaust plenums spaced from each other and from the bed by the space occupied by the inlet chamber and an inlet plenum spaced from the inlet chamber by the area occupied by the exhaust plenums and a plurality of inlet channels separating adjacent exhaust plenums and providing fluid communication between the inlet plenum and the inlet chamber. The inlet passages extend through the bed and communicate with the inlet chamber whereas the exhaust passages extend through the bed and the inlet chamber to communicate with the exhaust plenums. The inlet plenums extend from one side of the bed to the other and converge from one side toward the other. There is included a blower for supplying gases to the large end of the inlet plenum.

---

Typical prior art apparatuses include means for supplying gases to support sheets of glass which include inlet passages and exhaust passages whereby the gases flow to the sheet through the inlet passages and away from the sheet through the exhaust passages. Typical of such a prior art apparatus is that disclosed in U.S. Pat. 3,223,-501 where a plurality of individual cup-shaped modules provide areas of gas support above each module for supporting sheets of glass thereover. The modules are fed glasses through inlet passages which extend upwardly thereto from an immediately adjacent inlet plenum. The exhaust passages extend away from an area adjacent the modules and completely through the inlet plenum to an exhaust area. Such constructions provide serious operating disadvantages because the heated gases, in moving through the inlet plenum to the various inlet passages, move over a large distance and about many exhaust passages extending through the inlet plenum and therefore become undesirably cooled. In the prior art devices, the inlet gases are supplied to the inlet chamber at various positions and fill the inlet chamber and flow upwardly through the inlet passages and the temperature of the hot gases thus supplied to the inlet chamber can be as much as 100° higher immediately adjacent the position where gases are being pumped into the inlet plenum as compared to more remote positions in the inlet chamber. This in turn results in a temperature differential across the sheet of glass being supported on the hot gases.

Accordingly, it is an object and feature of this invention to provide a means over which a sheet of glass is supported on hot gases and including inlet passages and exhaust passages and wherein the supply of hot gases is maintained at a substantially constant temperature and pressure over the entire support area.

Another object and feature of this invention is to provide a novel apparatus including a bed over which a sheet of glass may be supported on hot gases with an inlet chamber immediately adjacent the underside of the bed and communicating with inlet passages extending through the bed, a plurality of exhaust plenums with exhaust passages extending through the inlet chamber and communicating with the exhaust plenums and an inlet plenum communicating with the inlet chamber through channels which separate the respective inlet plenums whereby hot gases are supplied at a multiplicity of closely spaced positions in the inlet chamber, thereby requiring a minimum of lateral flow of the hot gases about the relatively cooler exhaust passages so that the temperature of the gases over the supporting surface is substantially constant.

Other objects and attendant advantages of the present invention will be readily appreciated as the same becomes better understood by reference to the following detailed description when considered in connection with the accompanying drawings wherein:

FIG. 2 is a fragmentary cross sectional view taken substantially along line 2—2 of FIG. 1;

FIG. 3 is a cross sectional view taken substantially along line 3—3 of FIG. 2;

FIG. 4 is an enlarged fragmentary cross sectional view taken substantially along line 4—4 of FIG. 3; and FIG. 5 is an enlarged fragmentary cross sectional view taken substantially along line 6—6 of FIG. 4.

Referring now to the drawings wherein like numerals indicate like or corresponding parts throughout the several views, a preferred embodiment of an apparatus for transferring heat between the sheet of glass and gases and constructed in accordance with the instant invention is generally shown at 10.

Figure 1:
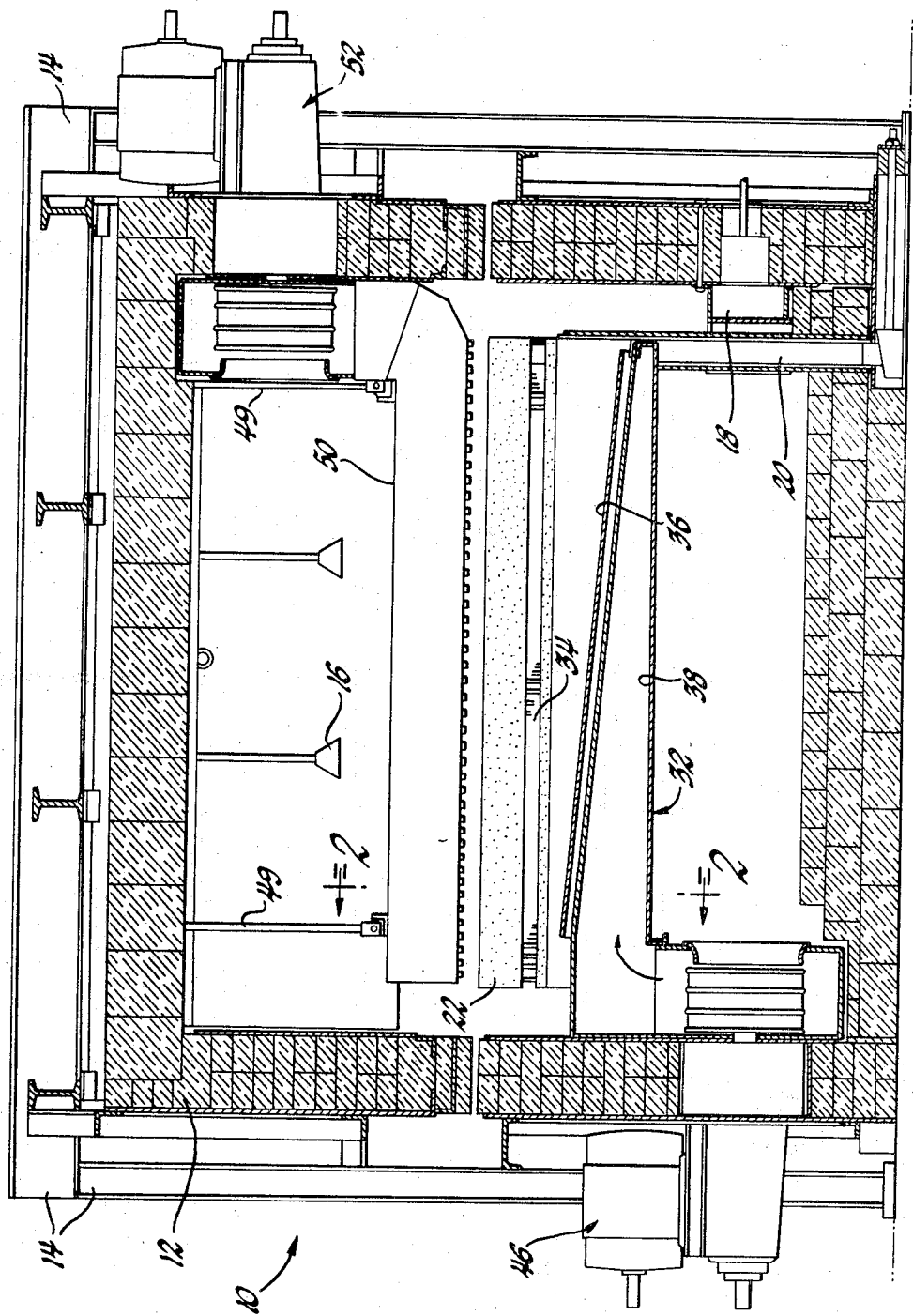
FIG. 1 is a cross sectional view of a preferred embodiment of the instant invention.

The apparatus 10 comprises a furnace defined by the insulating bricks 12 which are held in position by the supporting structure 14.

There is included means comprising the burners 16 and 18 for supplying hot gases within the furnace.

Supported within the furnace by appropriate structural members such as that shown at 20, is an elongated member defining a bed 22 which has an upper surface 24. The bed is preferably made of a ceramic type material.

A plurality of inlet passages 26 extend through the bed to communicate with the upper surface 24 thereof. A plurality of exhaust passages 28 extend through the bed and include the tubes 30 for defining portions thereof. Thus, gases may flow through the inlet passages 26 over the surface 24 and out through the exhaust passages 28.

There is also included means comprising a sheet metal structure, which is generally indicated at 32, for defining an inlet chamber 34, a plurality of exhaust plenums 36, and an inlet plenum 38. More specifically, there is included a plurality of juxtaposed units disposed along the bed 22. One complete unit is shown in FIG. 2 along with a portion of an adjacent unit. Each unit includes one inlet chamber 34, a plurality of exhaust plenums 36 (two as shown), and one inlet plenum 38. The bed 22 has opposite first and second sides along the furnace and the inlet chamber, the exhaust plenums, and the inlet plenum extend laterally of the bed and between the sides thereof. Each inlet chamber 34 is coextensive with and immediately adjacent the bottom portion of the bed to which it supplies gases.

The exhaust plenums 36 are spaced from each other and from the bed 22 by the area or space occupied by the inlet chamber 34. Each inlet plenum 38 is spaced from the inlet chamber 34 by the area or space occupied by the exhausted plenums 36.

The space between adjacent exhaust plenums 36 defines a plurality of inlet channels 40 which in turn provide fluid communication between the inlet plenum 38 and the inlet chamber 34. It is important to note that the inlet chamber covers a relatively large area and is supplied hot gases at a multiplicity of areas as defined by the channels 40.

In the preferred embodiment, insulation 42 is disposed between the exhaust plenums 36 and the inlet plenums 38 to reduce heat transfer therebetween.

The inlet passages 26 extend through the bed to communicate between the upper surface 24 and the inlet chamber 34. The exhaust passages 38 extend through the bed and, by way of the tubes 30, through the inlet chamber 34 to communicate with the exhaust plenums 36.

The upper walls of the exhaust plenum 36 are defined by the plates 44 which in turn are preferably made of an insulating material to reduce heat transfer. The plates 44 may be made of ceramic.

As best illustrated in FIGS. 1 and 3, each inlet plenum 34 is convergent from one side of the bed toward the other side. At the large end of each inlet plenum 34 there is disposed means comprising a blower or fan, which is generally indicated at 46, for supplying gases to the inlet plenum. The converging inlet plenum maintains the pressure of the gases therein substantially constant from the supply side to the remote side of the bed so that the pressure of the gases supplied to the upper surface of the bed 22 will remain substantially constant.

As best illustrated in FIG. 2, the inlet plenums 38 and 38' of adjacent units are convergent in opposite directions across the bed 22. In order words, the inlet plenum of one unit will be convergent from the left side to the right side of the bed as illustrated in FIG. 1, whereas the inlet plenum 38' in the immediately adjacent unit will be convergent in a direction from the right to the left as illustrated in FIG. 2. In a corresponding manner the exhaust plenums 36 will have a configuration opposite to the plenums 36' in the adjacent unit. Thus, the blowers 46 which supply the inlet plenum 38 and 38' are disposed on opposite sides of the bed along the furnace since there is one such blower 46 associated with each unit and adjacent units are alternately or oppositely disposed.

It is to be noted that there is also included auxiliary exhaust pasages 29 in the bed 22 to establish communication between the exhaust pasages 28', which are in line or immediately above the inlet chanels 40, and adjacent exhaust pasages 28, which are in line or immediately above the exhaust plenums 36. As is best illustrated in FIG. 5, the exhaust passages 28' which are disposed above the channels 40 are sealed off by a plug 48.

An upper module means 50 is supported within the furnace by the brackets 49 and is spaced above the bed 22 for impinging gases on the sheets of glass moving over the bed. There is also included means comprising the blowers generally indicated at 52 for supplying gases to the module means 50. The module means 50 is divided into a plurality of sections each of which is defined by a supply of gas for a separate blower 52. Each respective section is immediately above or corresponds to one of the units as illustrated in FIGS. 1 and 3 although the sections may or may not communicate with one another. An important feature is that the upper blower 52 is disposed on one side of the bed whereas the blower 46 for the gas supply unit immediately therebelow is on the opposite side of the furnace. This disposition provides a very effective circulation of the hot gases within the furnace to maintain the gases which impinge upon the glass sheet at a substantially constant temperature. It follows, therefore, that in the immediately adjacent section of the furnace the blower 46 for the adjacent unit will be on the opposite side of the furnace and the blower 52 for the upper section of the module means will be on the opposite side of the furnace (i.e. opposite to that illustrated in FIG. 1). This, again, increases the circulation of the gases to maintain the temperature thereof substantially constant.

This invention, therefore, provides a ductwork beneath the bed for supplying hot gases to the bed in a manner that the hot gases flow laterally a minimum distance in the inlet chamber 34 and therefore have a minimum contact with the tubes 30 thereby to reduce the cooling thereof by heat transfer with the exhaust gases; thus, providing gases over the surface 24 of the bed 22 which are at a substantially equal high temperature.

The embodiment of the invention in which an exclusive property or privilege is claimed are defined as follows:

1. An apparatus for transferring heat between a sheet of glass and gases, said apparatus comprising: a member having a surface with a plurality of inlet passage means therein and a plurality of exhaust passage means therein so that gases may flow through said inlet passage means over said surface and through said exhaust passage means; and means defining an inlet chamber which is coextensive with said member and adjacent thereto on the side opposite to said surface, a plurality of exhaust plenums spaced laterally from each other in a first direction generally parallel to said surface, said inlet chamber being disposed, between said exhaust plenums and said member in a second direction generally perpendicular to said surface, an inlet plenum spaced from said inlet chamber in said second direction by said exhaust plenums, and a plurality of inlet channels separating adjacent exhaust plenums and providing fluid communication between said inlet plenum and said inlet chamber; said inlet passage means extending through said member in said second direction to communicate with said inlet chamber, each of said exhaust passage means extending through said member and said inlet chamber in said second direction to communicate with one of said exhaust plenums.

2. An apparatus as set forth in claim 1 wherein said member has opposite first and second sides and said inlet chamber, said exhaust plenums, and said inlet plenum extend between said sides.

3. An apparatus as set forth in claim 2 wherein said inlet plenum is convergent from said first side toward said second side.

4. An apparatus as set forth in claim 3 including means for supplying gases to said inlet plenum on said first side whereby the pressure along said inlet plenum is maintained substantially constant.

5. An apparatus as set forth in claim 4 including auxiliary passages in said member to establish communication between exhaust passages in said member which are in line with said inlet channels and adjacent exhaust passages which are in line with said exhaust plenums.

6. An apparatus as set forth in claim 5 including a plurality of juxtaposed units disposed along said member with each unit comprising one said inlet chamber, a plurality of said exhaust plenums, and one said inlet plenum, said inlet plenums of adjacent units being convergent in opposite directions with means for supplying gases thereto being alternately disposed on said opposite sides.

7. An apparatus as set forth in claim 6 including a furnace and wherein said member comprises an elongated bed disposed in said furnace, and means for heating said gases in said furnace.

8. An apparatus as set forth in claim 7 including an upper module means spaced above said be for impinging gases on sheets moving over said bed, and means for supplying gases to said module means.

9. An apparatus as set forth in claim 8 wherein said module means is divided into a plurality of sections each of which is disposed above one of said units, said means for supplying gases comprises a blower in communication with the large end of each convergent inlet plenum and a blower in communication with each section of said module means on the opposite side of said bed from the first mentioned blower.

10. An apparatus as set forth in claim 9 wherein said means defining said chamber and said plenums comprises metal ductwork suspended from said bed.

References Cited

UNITED STATES PATENTS

| | | | |
|---|---|---|---|
| 2,223,124 | 11/1940 | Owen | 65—104 |
| 3,145,092 | 8/1964 | Decker | 65—351 |
| 3,293,015 | 12/1966 | Fredley | 65—104 |
| 3,293,302 | 12/1966 | Stilley | 65—104 |
| 3,455,671 | 7/1969 | McMaster | 65—104 |

ARTHUR D. KELLOGG, Primary Examiner

U.S. Cl. X.R.

65—104, 119, 350, 351